H. BERDAN.
Breech Loader.
No. 3,117. Reissued Sept. 15, 1868.
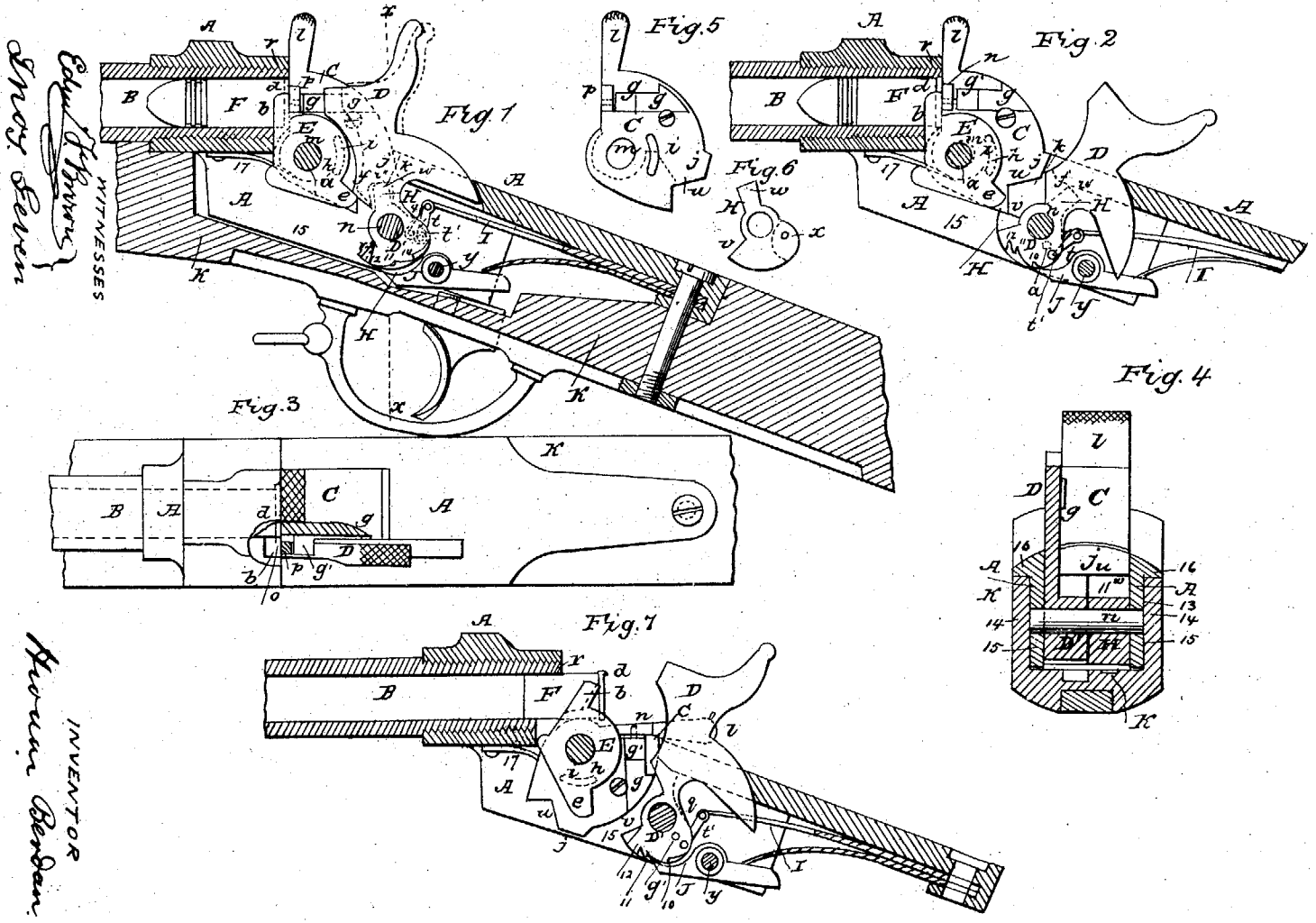
N. PETERS. Photo-Lithographer. Washington, D. C.

UNITED STATES PATENT OFFICE.

THE BERDAN FIRE ARMS MANUFACTURING COMPANY, OF NEW YORK, N. Y., ASSIGNEES OF HIRAM BERDAN.

IMPROVEMENT IN BREECH-LOADERS.

Specification forming part of Letters Patent No. 51,991, dated January 9, 1866; Reissue No. 3,117, dated September 15, 1868.

DIVISION A.

*To all whom it may concern:*

Be it known that we, the BERDAN FIRE ARMS MANUFACTURING COMPANY, of the city, county, and State of New York, assignees of HIRAM BERDAN, obtained Letters Patent dated January 9, 1866, and numbered 51,991, for Improvements in Breech-Loading Fire-Arms; and the following is a full, clear, and exact description of certain of said improvements desired to be secured in separate Letters Patent, reference being had to the accompanying drawings, forming part of this specification, in which—

Figure 1 exhibits a longitudinal section of the breech-receiver and portions of the stock and barrel, and a side view of the breech and lock of a breech-loading fire-arm constructed according to these improvements, showing the hammer down. Fig. 2 is a view, of similar character to Fig. 1, of the receiver, part of the barrel, the breech, and lock, but showing the hammer cocked. Fig. 3 is a top view corresponding with Fig. 1. Fig. 4 is a transverse section in the plane indicated by the line *x x* in Fig. 1. Fig. 5 is a side view of the breech. Fig. 6 is a side view of the independent brace by which the breech is partly supported at the time of firing. Fig. 7 is a similer view to Fig. 2, but shows the parts in different positions.

Similar letters and numbers of reference indicate corresponding parts in the several figures.

All breech-loading fire-arms heretofore constructed for the use of metallic cartridges with hollow flanged heads have been defective in one respect—viz., that in firing them the heads of the cartridges have been very liable to burst or be blown off, or to bulge out in such manner as to render it very difficut to open the breech. This has been generally owing to the thickness of the flanges of the heads of the cartridges, but in some cases owing to the imperfections in the construction of the gun, which left too much room for the said flanges, in either case the head of the cartridge being prevented from coming to a bearing against the breech-piece before firing.

With a view to obviate this defect one part of this invention consists in a device applied to act upon the front of the flange of the cartridge in such manner as to draw back the head against the breech before firing, such device consisting either of the cartridge-shell retractor or of a piece applied especially for the purpose.

The invention also consists in so applying and arranging a detonating-pin, upon which the hammer strikes to fire fixed-ammunition cartridges, that the said pin strikes the cartridge at a point opposite to where it is held back by the device above mentioned, which draws back the cartridge against the breech, such device being of hardened steel, and therefore not bruised or marred by the repeated operation of the pin, as the barrel, which is soft, is apt to be.

It also consists is so enlarging the hole provided in the swinging breech of a breech-loading fire-arm, for the reception of the pin upon which it works, that the breech may have a direct rear support in the breech-receiver at the time of firing, and yet be free to swing back loosely to open the rear end of the barrel for loading.

It also consists in a novel arrangement of a detonating-pin and hammer in a single-shot breech-loading fire-arm having a swinging breech, whereby the gun can be readily operated when the hammer is at half-cock.

It also consists in the combination, with one mainspring, of two or more stirrups, one for operating the hammer, and the other for operating or controlling the operation of a movable brace which locks the breech at the time of firing.

It also consists in the employment, in combination with a swinging breech-piece, of a movable brace or tumbler having a suitable projection upon its lower and forward part, whereby it is made to lock the breech and prevent the loading of the arm when the hammer is cocked.

It also consists in the combination, with the swinging breech of a breech-loading fire-arm, of a brace for locking the breech in a closed condition at the time of firing, which is attached to the mainspring, but swings independently of the hammer and tumbler.

It also consists in so combining and arranging a movable brace, which operates to lock the breech at the time of firing, a three-notched tumbler, a sear, and a swinging breech that while the hammer is locked by the entrance of the sear into the first or safety notch of the tumbler, just out of contact with a detonating-pin, by which the cartridge is fired, the breech is locked by the said brace; and it further consists in so constructing the breech-receiver of a breech-loading fire-arm with horizontal and vertical flanges, and fitting the same into the stock, that the ends of the pin upon which the breech, the hammer, and the sear work may abut against the cheeks of the stock and be kept in place without the said pins being screwed into the receiver, thereby affording greater facility for taking the lock and breech-operating mechanism to pieces when the breech-receiver is taken out of the stock.

To enable others skilled in the art to apply these improvements to use, we will now proceed to describe their construction and operation.

A is the breech-receiver, having the barrel B firmly screwed into it, and having in rear of the socket which receives the barrel a suitable opening for the reception of the swinging breech C, the hammer D, and the cartridge-shell retractor E. The cartridge-shell retractor represented also serves the purpose of drawing back the cartridge against the face of the breech preparatory to firing, and for this purpose it is arranged in front of the hammer, on the left side of the breech, where it swings on the same pin, *a*, as the breech, and it has an upward projection, *b*, in front, which enters a recess provided for it in the left-hand side in the rear end of the barrel; and in the back of this projection there is a rabbet-shaped recess, *c*, Fig. 3, for the reception of the front part of one side of the flange *d* of the head of the fixed ammunition-cartridge F. For the same purpose the bottom of the rear part of the said retractor has a rearward projection, *e*, upon which a forward projection, *f*, on the hammer strikes as the hammer descends in firing before the head of the hammer strikes the head of the detonating-pin *g*, by which the priming of the cartridge contained in the flange *d* is fired. By this action of the hammer upon the projection *e* the projection *b* is pressed back against the front of the flange of the cartridge-shell, and so made to press back the head of the cartridge against the face of the breech before the cartridge is fired, and thus bring it to a firm bearing against the breech, and prevent its head from being burst or blown off, or so bulged out as to render it difficult to open the breech, as is likely to be the case if the flange does not fill the place provided for it, and the head does not bear against the breech before or at the time the firing of the charge takes place. The retractor E is made to draw back the discharged cartridge-shell as the breech is opened by means of a pin, *h*, which is secured in the retractor, and projects laterally from the inner side thereof into the curved groove *i* in the contiguous side of the breech, the said groove being of such length as to prevent any action upon the said pin until the breech has been opened nearly wide enough for the withdrawal of the cartridge-shell from the barrel, when the upper end of the said groove comes in contact with the said pin, and the completion of the opening movement of the breech causes the said end of the groove to depress the said pin, and so draw back the upper projection, *b*, of the retractor far enough to draw out the head of the cartridge-shell a little way from the barrel. This operation is illustrated in Fig. 7, where the breech is represented open.

The detonating-pin is so arranged, as shown in Figs. 2 and 3, to slide in a groove in the left side of the breech and through a projection, *p*, on the same, that its point will strike on the back of the head of the cartridge, near the edge of the flange, and opposite to where it is supported in front by the projection *b* of the retractor or device by which it is drawn back against the breech. This projection *b*, being of steel and hardened, is not marred by the repeated striking of the cartridge, as the barrel (which is always soft) is after much use when the cartridge is supported by it opposite to where the detonating-pin strikes. The swinging breech C swings upon the pin *a*, before mentioned, and represented in Figs. 1, 2, and 5. The said pin is situated a short distance below and in the rear of the barrel. The face of the breech is flat, so that when the breech is closed it fits square up against the rear end of the barrel, and the upper part of the back of the back is of arc form concentric with the pin *a*, that it may swing back into the opening at the top of the receiver to open the barrel for loading; but the lower part of the back is made with a projecting face, *j*, to abut against a bearing, *k*, at the back of the opening in the receiver, and so receive support at the rear at the time of firing. At the top there is an upwardly-projecting thumb-piece, *l*, to which to apply the thumb to open it. The hole in this breech through which the pin *a* passes is elongated in a direction obliquely upward and backward, as shown at *m*, to allow the necessary play of the breech upon the pin, to permit its shoulder *j* to abut against the bearing *k* at the time of firing, and yet to allow the breech to swing back loosely to open the barrel. During the commencement of the opening of the breech by a back-pressure of the thumb-piece *l*, the lower edge of the head of the cartridge (and not the pin *a*) is the fulcrum; and to enable the face *j* to swing clear of the bearing *k* the said face and the corresponding face of the bearing *k* are made concentric with the point in which the lower edge of the cartridge-shell is situated. When the breech has swung back far enough for the shoulder *j* to clear the bearing *k*, the hole *m* has moved so far downward and forward upon the pin *a* that the said pin becomes the fulcrum, and upon this fulcrum the backward swinging movement of the breech upon the rear end of the barrel is completed. By bringing the fulcrum of the breech upon the lower edge of the cartridge-shell, as above described, the resistance of the bearing *k* to the back-pressure on the breech at the time of firing is made to act more nearly in the line of said pressure.

In order to make the movement of the breech concentric with the pin *a* after it has cleared the bearing *k*, a spring, 17, is attached to the receiver A in rear of the breech in such manner as to press the breech upward against the bottom of the pin when the face of the breech is clear of the lower edge of the cartridge-shell, which constitutes its fulcrum during the first part of its opening movement. This spring 17 is made to perform other important functions—viz., that of closing the breech after it has been partly closed by hand, that of keeping it closed, and that of preventing it from accidentally closing when wide or nearly wide open. In order to make the said spring perform the first and second of those functions, that portion of the peripherical surface of the hub of the breech-piece with which the said spring is in contact when the breech is closed, as shown in Figs. 1 and 2, is flattened in such manner that if the breech should be turned back in the smallest degree in a direction to open it the spring will bear on an angular surface, and the line of pressure will be in rear of the axis of the pin, and thus exert a tendency to turn it in the opposite direction. This tendency will not only act to keep the breech closed when it has been closed, but will also act to complete the closing movement when said movement has been so far performed by hand as to enable the spring to act, as described, on the aforesaid angular surface. When the breech has been turned back in opening it so far that the pressure of the spring acts on the portion of its hub behind the angle formed at the rear of the aforesaid flattened surface, the spring no longer exerts the same tendency to close it, but yet presses with sufficient friction to prevent it from shaking back and forth, and from being closed accidentally when open.

It has been hereinbefore stated that the detonating-pin *g* is arranged on the left-hand side of the breech. This is because the hammer D is arranged on that side, and the reason for arranging the hammer on that side is to leave an unobstructed passage in rear of the barrel when the breech is open, as shown in Fig. 7, with room for the thumb of the right hand to draw out the discharged cartridge-shells from the barrel and push new ones thereinto while the hand is on that side of the stock. The hammer is arranged so far to the left that its inner side is not only outside of the line of the barrel on that side, but outside of the line of the connterbore T, as shown in Fig. 3, so that the cartridge or shell may pass freely in or out of the barrel. This arrangement of the hammer enables it to be brought much more forward and nearer the barrel, which is very desirable; but the detonating-pin, having to strike the cartridge and to work in the breech, cannot be arranged in a line with the so-arranged hammer, and therefore it is furnished with a projection on its outer side for the hammer to strike upon. The detonating-pin may be so constructed and fitted to the breech as to strike upon the center of a centrally-primed cartridge, the projection *g'* being left on the said pin protruding from the left side of the breech for the hammer to strike upon. The object of using the detonating-pin is that if the hammer were constructed and arranged to strike directly upon the cartridge the hammer would have to move much farther back, and too far for half-cock before the breech would open or allow the shell to be retracted.

The hammer D swings in the usual manner upon a pin or shaft, *n*, inserted transversely through the breech-receiver. Upon the same shaft is arranged the independent double-action brace H, Figs. 1, 2, 4, and 6, by which the breech is partly supported in a closed position at the time of firing. This brace turns freely upon the shaft *n*, but is not attached to either hammer or tumbler. It has its form shown in Figs. 1 and 2, but more distinctly in Fig. 6. Its upper end, *w*, which acts against a shoulder, *u*, on the breech, as shown in Fig. 1, when the hammer is down, is made concentric with the shaft *n*, and its face *v*, which acts against the bottom of the breech, as shown in Fig. 2, when the hammer is at full-cock, is radial, or nearly so, to the said shaft. The said brace is connected by a stirrup, *q*, with the end of the mainspring I, by which the blow of the hammer is produced, the connection of the said spring being by means of the same pin, *s*, which connects the hammer-stirrup *t*; but the pin *q'*, which connects the said stirrup *q* with the said brace, is very much nearer to the said pin *a* than the pin *t'*, which connects the hammer-stirrup with the tumbler D'. This connection of the brace H with the mainspring causes the upper end of the brace H to be moved on the shaft *n* by the mainspring at the same time and in the same direction as the hammer; but the arrangement of the stirrup-connections *q'* and *t'* of the said brace and the tumbler relatively to the hammer-shaft *n* causes the brace to move quicker than the hammer upon the said shaft and to have a greater movement thereon, and the result of this greater movement, with a proper arrangement of the end *w* and face *v*, is that while the said brace is thrown entirely out of contact with the breech, as shown in Fig. 7, and so leaves the breech free to open when the hammer is at half-cock, it locks the breech not only while the hammer is down, but while at full-cock. The projection V on the bottom of the brace may be put on the tumbler instead of the brace. The object of this projection is to prevent the breech from being opened either accidentally or otherwise while the hammer is at full-cock, and renders it impossible to load while at full-cock, which is very dangerous in the excitement of battle. Another advantage of the greater and quicker movement of the brace as compared with that of the hammer is that it brings the half-cock position of the hammer farther forward, so that if in letting the hammer down it should slip from the thumb it does not fall with force enough to explode the priming of the cartridge. The quicker and greater movement of the brace it is obvious cannot be obtained when it is rigidly attached to the hammer or tumbler. The tumbler has three notches for the reception of the sear J—viz., the full-cock notch 10 and the half-cock notch 11, common to the tumblers of most fire-arms, and a third, or what is a safety-notch, 12, such as is provided in the tumbler of some other fire-arms in front of the half-cock notch. The sear operates in this safety-notch in the usual manner to lock the hammer a short distance out of contact with the detonating-pin. The upper end, *w*, of the brace H is so constructed and arranged that when the hammer is drawn back far enough to be thus locked the brace still remains under the shoulder *u* of the breech, and prevents the breech from being accidentally opened. This condition of the hammer, the sear, and the brace H is illustrated in red outline in Fig. 1.

The construction of the breech-receiver A and mode of fitting the same into the stock, by which screw-threads are dispensed with on the pins *a*, *n*, and *y*, upon which the breech, the hammer, and the sear work, are illustrated in the transverse section, Fig. 4. The breech K is mortised out from the top, as shown at 13 13, leaving cheeks 14 14 of suitable thickness at the sides. The breech-receiver is made with vertical flanges 15 15 to fit into the mortise 14 14, and with horizontal flanges 16 16 to rest upon the upper edges of the said cheeks. The flanges 15 15 are simply drilled at suitable opposite points for the reception of the several pins, which are made cylindrical or perfectly plain, and of such length that when in place their ends are flush with the outer faces of the flanges, and when the breech-receiver is secured in place in the said stock the said pins are kept in their places by the cheeks 14 14 of the stock. When the receiver is taken out of the stock, the pins can easily and quickly be pushed out to take out the breech, hammer, and sear, and as quickly replaced after the breech, hammer, and sear have been replaced.

We do not claim lifting a swinging breech-piece entirely by means of the hammer, as the attention of HIRAM BERDAM was first called to this feature by Reuben McChesney; neither do we claim, broadly, a swinging breech-piece opening when the hammer is at half-cock.

What we claim as the invention of HIRAM BERDAN, and desire to secure by Letters Patent, is—

1. The employment, in a breech-loading fire-arm, of a device so applied and operated as to press back the cartridge against the face of the breech preparatory to firing, substantially as and for the purpose herein described.

2. So applying and operating the cartridge-shell retractor of a breech-loading fire-arm that it shall serve the purpose of pressing back the cartridge against the face of the breech preparatory to firing, substantially as herein specified.

3. So arranging the detonating-pin of a breech-loading fire-arm that it shall strike the back of the head of the cartridge opposite to where it is supported by a movable device, which serves the purpose of pressing back the cartridge against the breech, substantially as herein set forth.

4. The elongation of the hole provided in the swinging breech for the reception of the pin upon which it swings, whereby the breech has a direct support in the breech-receiver at the time of firing, and yet is free to swing back loosely to open the barrel for reloading, substantially as herein set forth.

5. The relative position and arrangement to each other of the hammer, firing-pin, swinging breech, and line of bore, by which the line of bore is unobstructed and the loading facilitated when the hammer is at half-cock, substantially as herein described.

6. The combination, with one mainspring, of two or more stirrups, one or more connecting the tumbler or hammer, and the other connecting a brace for locking the breech when the hammer is down, substantially as herein set forth.

7. In combination with a swinging breech-piece, the employment of a suitable projection on the lower or front side of the brace or tumbler, whereby the loading at full-cock is prevented, substantially as and for the purpose herein specified.

8. So constructing and applying a brace to a swinging breech for breech-loading fire-arms that it swings on a tumbler-shaft detached from the tumbler, but is attached to the mainspring in such a way as to give a greater motion to the brace than is given to the tumbler.

9. So combining a movable brace, which operates to lock the breech at the time of firing, a three-notched tumbler, and a swinging breech in a breech-loading fire-arm that while the hammer is locked by the sear in the first or safety notch the breech is locked in a closed condition by the said brace, substantially as herein set forth.

10. The combination of the flanged breech-receiver or lock-frame A, the pins upon which the hammer, breech, and sear work, and the cheek-pieces of the stock, by which the pins are held in place, substantially as herein described, and for the purpose herein set forth.

C. L. PERKINS,
*President of the Berdan Fire Arms Manufacturing Co.*

ISAAC FRYER,
*Secretary of the Berdan Fire Arms Manufacturing Co.*

Witnesses:
S. D. SCHUYLER,
JAMES SIMSON.